July 13, 1926.
L. LORENZ
1,592,608
PHOTO ENGRAVING PLATE WHIRLER
Filed April 21, 1925
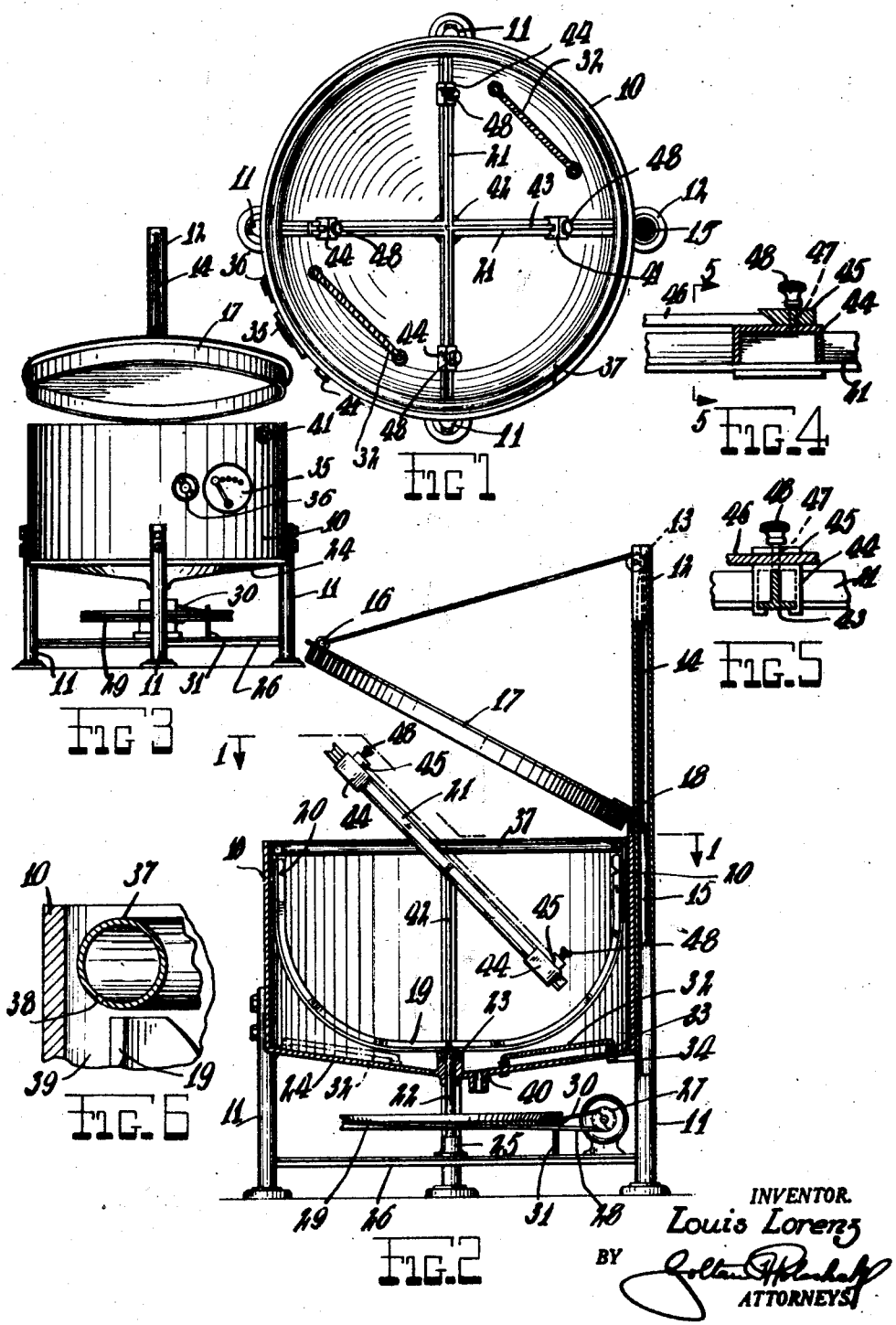
INVENTOR.
Louis Lorenz
BY
ATTORNEYS Patented July 13, 1926.

1,592,608

UNITED STATES PATENT OFFICE.

LOUIS LORENZ, OF NEW YORK, N. Y.

PHOTO-ENGRAVING-PLATE WHIRLER.

Application filed April 21, 1925. Serial No. 24,894.

This invention relates to improvements in photo-engraving plate whirlers, as they are, for instance, described in my Patents No. 1,530,185, dated March 17, 1925, and No. 1,531,797, dated March 31, 1925, and it is the principal object of my invention to provide a plate whirler for washing, sensitizing, and drying photo-lithographic plates, including an automatic plate holder, adjustable to any size of plate up to the maximum capacity, and a controllable electric heating device, as well as a variable speed motor equipped with a special controller allowing a speed regulation from 50 to 100 R. P. M.

Another object of the invention is the provision of a plate whirler of this type which is equipped with a perfectly balanced cover.

A further object of the invention is the provision of a plate whirler of simple construction, the electric heater of which consists of several units adapted to be removably secured to the bottom of the main tank under the water container.

A still further object of the invention is the provision of a plate whirler of the above described character, comprising a plate holder allowing an adjustment to its support.

These and other objects and advantages of my invention will become more fully known as the description thereof proceeds, and will then be specifically defined in the appended claims.

In the accompanying drawing, forming a material part of this disclosure:

Fig. 1 is a top plan view of the improved plate whirler, constructed according to the present invention, seen in the direction of arrows 1—1 of Figure 2.

Fig. 2 is a sectional side elevation of a plate whirler according to the invention.

Fig. 3 is a front elevation thereof.

Fig. 4 is a detail sectional view of the plate holder and gripping element.

Fig. 5 is a section on line 5—5 of Fig. 4.

Fig. 6 is a sectional enlarged detail view of a water pipe and drain.

The apparatus comprises a casing 10 supported by a plurality of posts 11, one of which is hollow, and extended for a considerable distance beyond the upper end of the casing, as indicated at 12. In the upper part of said hollow post extension 12 a pulley 13 is arranged over which a cable 14 or the like, is guided having to one of its ends a weight 15 attached which is vertically reciprocating in the hollow posts 11 and 12. The other end of cable 14 is secured to an eye 16 of the cover 17 hingedly attached at one point, as at 18, to the casing.

Within the casing a tank 19 is rotatably arranged having a ring notch 20 near its upper edge into which engage the ends of the plate holder 21.

The tank 19 is seated on top of a rotating vertical shaft 22 rotating in ball bearings as, for instance, indicated at 23, and extending through the bottom 24 of the casing and resting with its lower ends in bearings 25 carried by a platform 26 held between posts 11.

This platform carries in juxtaposition to shaft 22 an electric motor 27 having a driving pulley attached to its shaft, over which a belt 28 is guided which is also guided over a large pulley 29 secured to the shaft 22, and over a small pulley 30 on a pin 31 supported on a platform 26.

Below the bottom of tank 19, a purality of heating units 32 are secured to the bottom 24 of the casing and by means of capped stuffing boxes 33 held in position by means of the nuts 34. The speed of the motor is controlled by a switch 35 on the front of the casing 10, while the heating units are controlled by means of a switch 36.

The water is supplied to tank 19 by means of a sprinkler pipe 37 having a plurality of openings 38 and allowing the water to flow down through the channels 39 to the bottom 24 of the tank which is equipped with the drain pipe 40. A water inlet 41 allows the supply of the pipe 37 with water from any desired suitable source.

The plate holder 21 consists of a plurality of arms forming a cross supported in its center upon a post or standard 42 extending through the tank concentrically thereof.

Each arm of the cross carries an inverted T-member 43 straddled by a bracket 44 carrying a wedge-shaped element 45 adapted to grip over the plate 46 in the manner illustrated in Figure 4 and held in position by a screw 47, or the like, carrying at its upper end an operating knob 48. The plate holder 21 is secured to the post 42 in such a manner that it may be set at any desired angle to the same.

The operation of my device will be clear from the above description by referring to the drawing, if the plate has been placed on the holder and secured thereon, by the proper operation of the adjustable clamping elements, a few drops of the coating or emulsion are then poured on the plate at the center thereof and the motor is started. The plate is then caused to revolve slowly, in order to gradually distribute the emulsion by centrifugal force until it is evenly spread over the plate. If the cover is closed and the heating units are energized, the plate will be dried while the water is flowing off by the drain taking with it all impurities that may accumulate on the bottom.

It is to be understood that I have described and shown by way of example, one of the many forms of making my improved plate whirler, and that such changes may be made in the construction of the minor details thereof as fall within the scope of the appended claims, without departure from the spirit of my invention.

Having thus described my invention, what I claim as new, and desire to secure by Letters Patent, is:

1. In a photo-engraving plate whirler, a stationary casing supporting a water flushing system, a tank rotatably mounted in said casing by means of a vertical shaft having a bearing in the bottom of said casing and extending therethrough and resting with its lower end in a bearing carried by a platform held by supports for said casing, a vertical shaft in the centre of said tank, said tank being provided with a ring notch, a plate holder carried by the said vertical shaft and engageable in said ring notch of the tank to be rigidly held during the rotation of said tank.

2. In a photo-engraving plate whirler, a stationary casing supporting near its upper edge a water flushing system, a tank rotatably mounted in said casing by means of a vertical shaft having a bearing in the bottom of said casing and extending therethrough and resting with its lower end in a bearing carried by a platform held by supports for said casing, a vertical shaft in the centre of said tank, said tank being provided with a ring notch, a plate holder of substantially cross-shape carried by the said vertical shaft and engageable in said ring notch of the tank to be rigidly held during the rotation of said tank.

3. In a photo-engraving plate whirler, a stationary casing supporting a water flushing system characterized by a sprinkler pipe provided with a plurality of apertures, a tank rotatably mounted in said casing by means of a vertical shaft having a bearing in the bottom of said casing and extending therethrough and resting with its lower end in a bearing carried by a platform held by supports for said casing, a vertical shaft in the centre of said tank being an extension of the before mentioned vertical shaft, said tank being provided with a ring notch, a plate holder carried by the said vertical shaft and engageable in said ring notch of the tank to be rigidly held during the rotation of said tank.

4. In a photo-engraving plate whirler, a stationary casing supporting a water flushing system characterized by a sprinkler pipe provided with a plurality of apertures, a tank rotatably mounted in said casing by means of a vertical shaft having a bearing in the bottom of said casing and extending therethrough and resting with its lower end in a bearing carried by a platform held by supports for said casing, a vertical shaft in the centre of said tank being an extension of the before mentioned vertical shaft, said tank being provided with a ring notch, a plate holder carried by the said vertical shaft and engageable in said ring notch of the tank to be rigidly held during the rotation of said tank, and means for securing plates of varying dimensions to said plate holder.

5. In a photo-engraving plate whirler, a stationary casing supporting a water flushing system characterized by a sprinkler pipe provided with a plurality of apertures, a tank rotatably mounted in said casing by means of a vertical shaft having a bearing in the bottom of said casing and extending therethrough and resting with its lower end in a bearing carried by a platform held by supports for said casing, a vertical shaft in the centre of said tank being an extension of the before mentioned vertical shaft, said tank being provided with a ring notch, a plate holder carried by the said vertical shaft and engageable in said ring notch of the tank to be rigidly held during the rotation of said tank, a plurality of heating units at the bottom of said casing, means for regulating the supply of heat, and means for securing plates of varying dimensions to said plate holder.

In testimony whereof I have affixed my signature.

LOUIS LORENZ.